United States Patent [19]
Stein

[11] Patent Number: 5,632,455
[45] Date of Patent: May 27, 1997

[54] APPARATUS FOR WORKING ON SHEET MATERIAL AND HAVING FRICTION HUB

[75] Inventor: Darryl C. Stein, Andover, Conn.

[73] Assignee: Gerber Garment Technology, Inc., Tolland, Conn.

[21] Appl. No.: 505,100

[22] Filed: Jul. 21, 1995

[51] Int. Cl.⁶ .................................................. B65H 75/28
[52] U.S. Cl. ........................... 242/538.3; 242/578.3
[58] Field of Search .................... 242/415.1, 538, 242/538.3, 578, 578.2, 578.3, 599.2, 599.4

[56] References Cited

U.S. PATENT DOCUMENTS

| Re. 34,294 | 6/1993 | Gerber. | |
|---|---|---|---|
| 2,034,862 | 3/1936 | Dunham. | |
| 2,134,043 | 10/1938 | Hoppe et al. | 242/578 |
| 2,376,879 | 5/1945 | Matthews et al. | 242/538 |
| 2,531,558 | 11/1950 | Debrie. | |
| 2,533,307 | 7/1950 | Amos et al. | |
| 3,047,249 | 7/1962 | Moser et al. | |
| 3,073,542 | 1/1963 | Kaashoek | 242/538.3 |
| 3,825,202 | 7/1974 | Robinson | 242/578.3 |
| 4,148,444 | 4/1979 | Hehner | 242/573 |
| 4,452,403 | 6/1984 | Arronte. | |
| 4,610,407 | 9/1986 | Stubbmann. | |
| 4,804,149 | 2/1989 | Murphy. | |
| 4,915,319 | 4/1990 | Gerber. | |

FOREIGN PATENT DOCUMENTS

| 0281790 | 9/1988 | European Pat. Off. |
| 4026895 | 2/1992 | Germany. |
| 1-308654 | 12/1989 | Japan. |
| 6-312861 | 11/1994 | Japan. |

Primary Examiner—John P. Darling
Attorney, Agent, or Firm—McCormick, Paulding & Huber

[57] ABSTRACT

A progressive plotter for working on successive segments of an elongated web of sheet material extending across a work surface has a pen supported to move in marking relation to material on the work surface in response to command signals received from a programmable controller. The machine includes a supply roll for paying-off sheet material and a take-up roll for receiving material from the supply roll. Each roll has a cylindrical tubular cardboard roll core extending throughout its axial length. The rolls are supported by flanged hub assemblies, each including a cylindrical hub member having a rough generally cylindrical peripheral surface and a diameter smaller than the inside diameter of the smallest roll core to be supported by the machine. The hub members rotate in rolling engagement with the inner peripheral surfaces of the roll cores to drive and/or support the rolls. Each hub assembly has an axially inwardly open recess defined by the hub member and its associated flange for receiving an end portion of a roll core which extends beyond the radially disposed end face of the sheet material wound thereon.

20 Claims, 7 Drawing Sheets

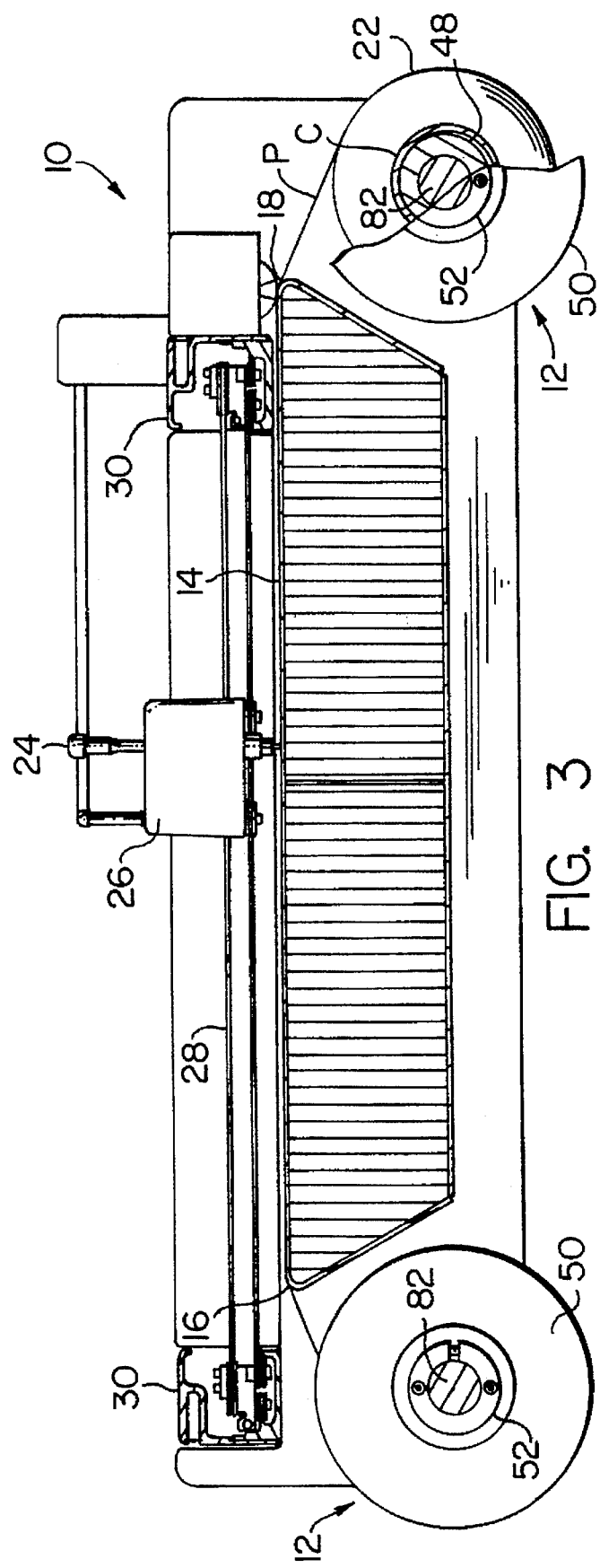

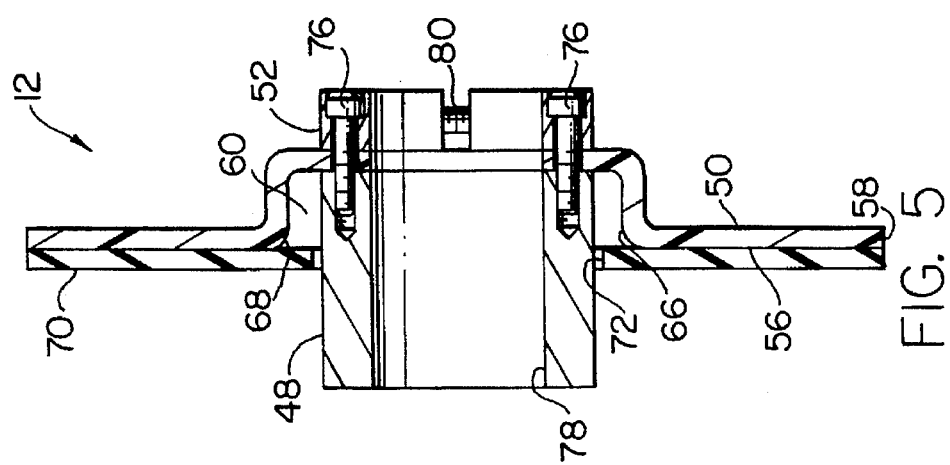
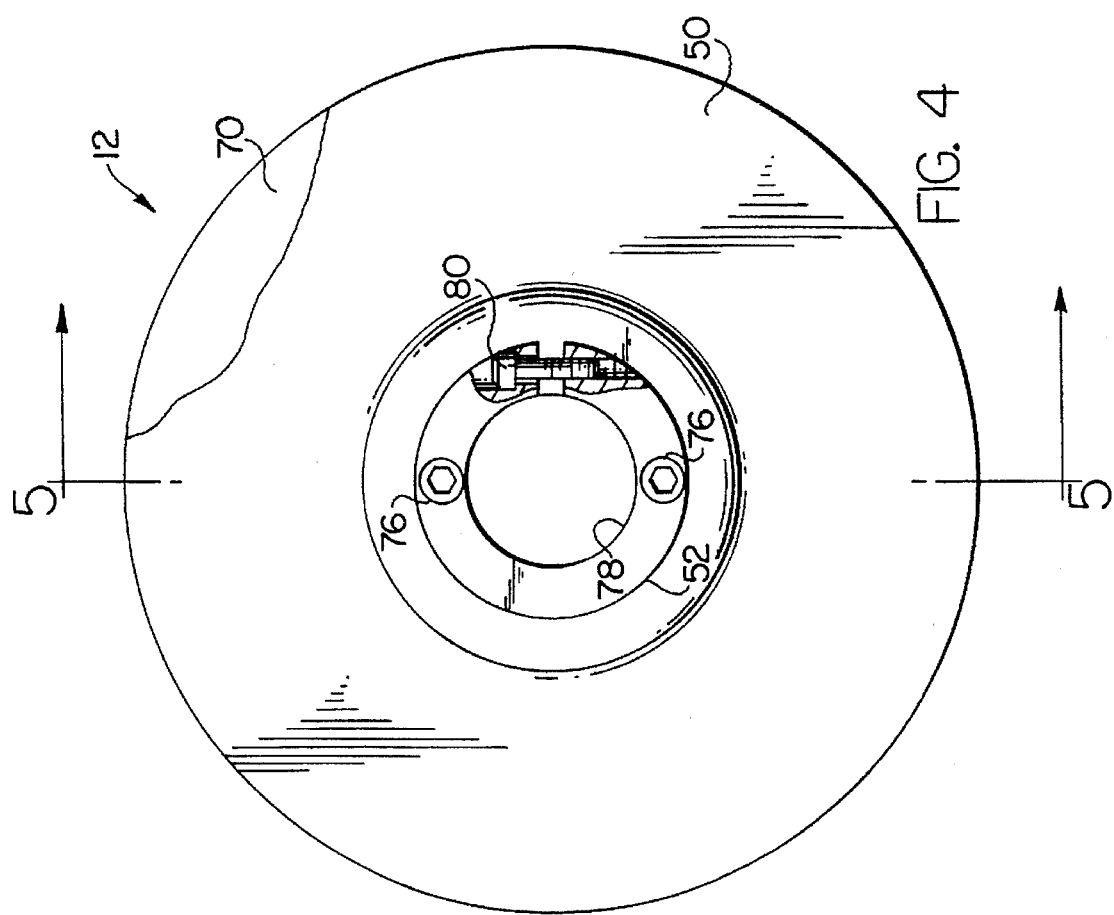

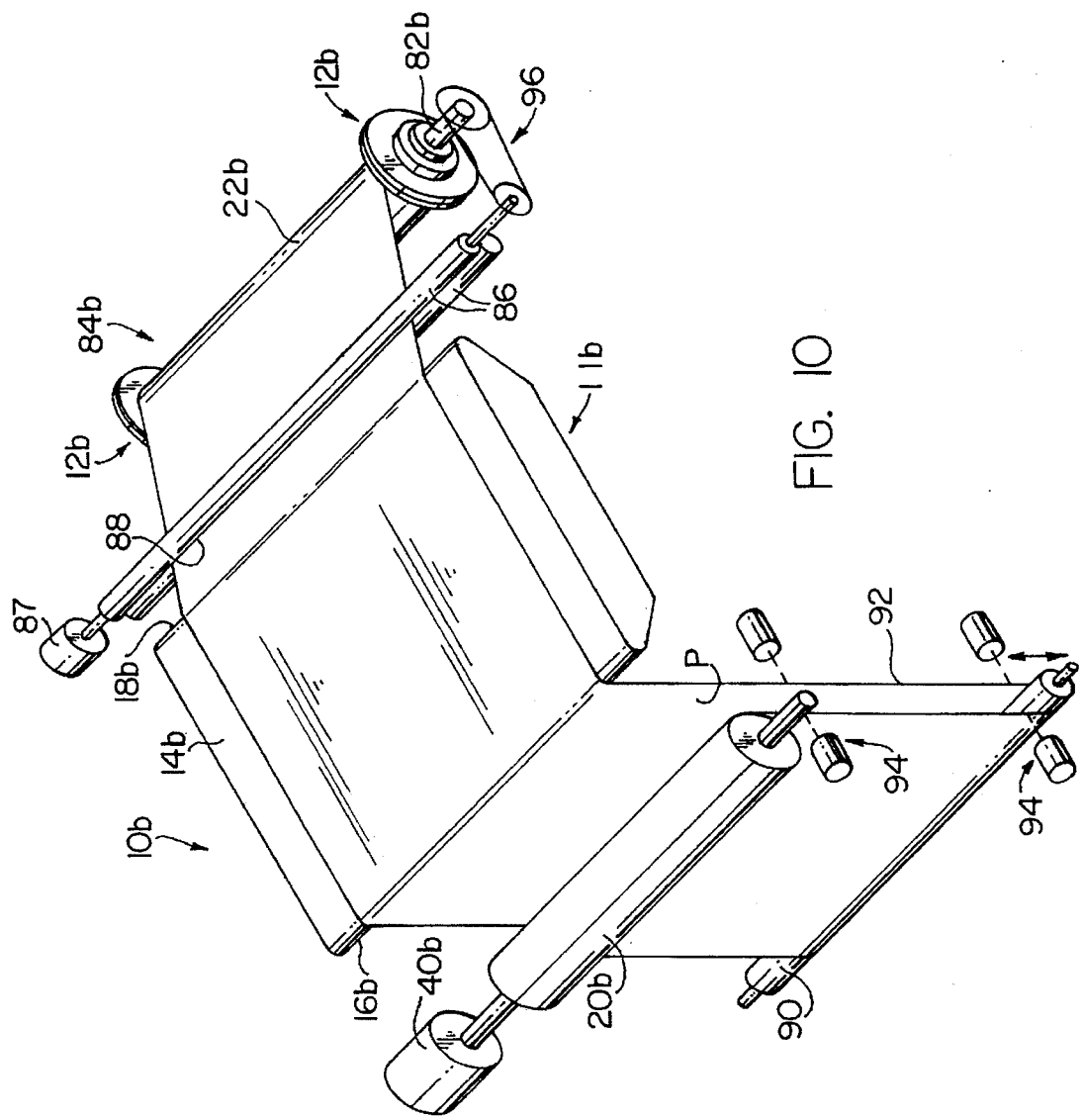
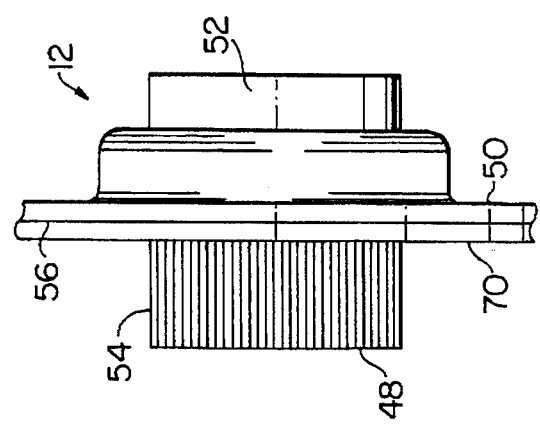

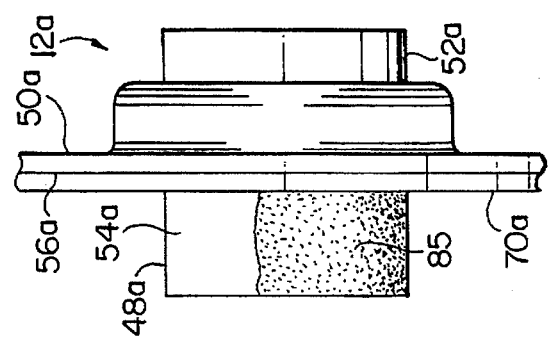
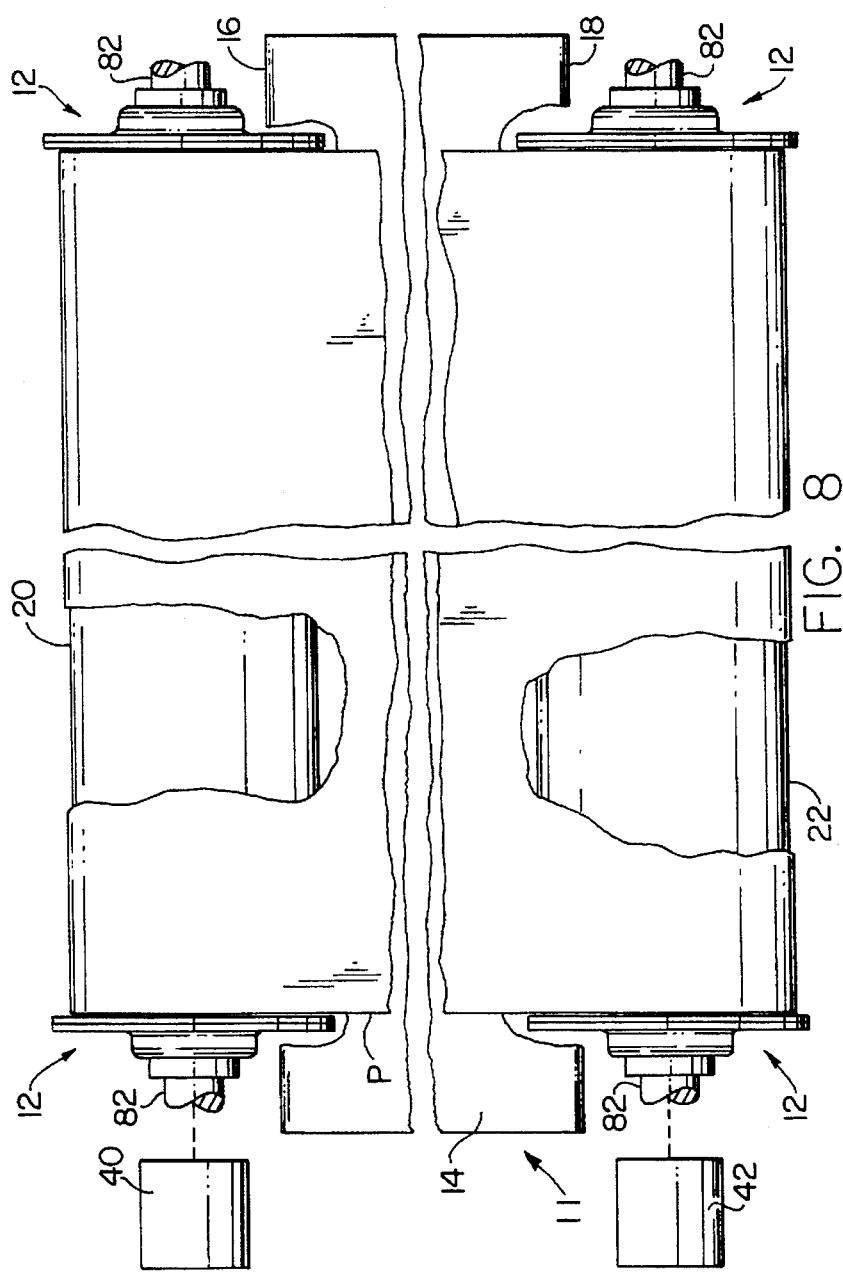

APPARATUS FOR WORKING ON SHEET MATERIAL AND HAVING FRICTION HUB

BACKGROUND OF THE INVENTION

This invention relates in general to apparatus for working on sheet material and deals more particularly with an improved machine for progressively working on a long lengths of sheet material wound on tubular roll cores and wherein the machine includes at least one hub assembly for driving and/or supporting a roll core to pay-off and/or take-up sheet material processed by the apparatus.

In a machine of the type with which the present invention is concerned, such as a plotter, for example, work is progressively performed on successive sections of an elongated web of sheet material supported on a work surface. A tool such as a plotting instrument or pen supported for movement in at least X and Y coordinate directions relative to the work surface in response to command signals received from a programmable controller performs the work. The machine may operate intermittently alternately advancing the sheet material relative to the work surface and performing work on the sheet material after the sheet material has been advanced and while it is maintained in a stationary position relative to the work surface or the machine may operate continuously, simultaneously advancing the sheet material and working on the material as it is advancing across the work surface.

If the sheet material processed by the machine is to be stored for later use or moved to another machine for further processing the present machine may include both a pay-off or supply roll and a take-up roll. However, if material processed by the machine is to be separated from the web at the machine for immediate use the machine may include only a supply roll. In either instance it is essential to precisely control the positioning and movement of the web material relative to the work surface to coordinate the position of the material relative to the tool to assure a satisfactory work product.

Such a machine must, of course, be adapted to process commercially available rolls of sheet material. Such rolls generally comprise sheet material wound on cylindrical tubular cardboard roll cores. Hub assemblies are usually employed to support the rolls of material and interface with the motor or motors which rotate the rolls. Roll dimensional consistency has proven critical to providing proper interface, but, unfortunately, core dimensions are not always consistent, especially where the material is obtained from more than one manufacturer or imported from more than one country.

Roll cores often vary in thickness and both in outside and inside diameter. Although the axial length of a roll core and the width of the material wound thereon are usually equal, the ends of the roll core are not always flush with the radially disposed ends of the wound material. Thus, for example, a roll core may extend from one end of a roll of wound material and be recessed with respect to the opposite end of the wound roll. These dimensional inconsistencies and winding irregularities present problems in providing proper hub interface.

A typical hub assembly includes a hub for coaxial positioning within the end of an associated roll core and a radially disposed annular flange for engagement or near engagement with an associated end of the roll core and an associated radially disposed end face of the sheet material wound thereon. If the roll core protrudes from one end of the wound sheet material and is recessed with respect to the opposite end of the material the flange on the end from which the core protrudes will be spaced from the end face of the wound sheet material. As the sheet material is paid-off of such a roll, the material spaced from the flange will have a tendency to telescope so that material will leave the roll traveling in a skewed path relative to the roll axis as the roll of material rotates. If the inside diameter of the roll core is too small difficulty will be encountered in assembling a hub with and removing a hub from the roll core. If the inside diameter of the roll core is too large the drive hub will not transfer rotation of the drive motor to the roll of material.

Accordingly, it is the general aim of the present invention to provide an improved machine of the aforedescribed general type which includes a hub assembly for supporting and/or driving a roll of sheet material having a generally cylindrical tubular cardboard roll core and wherein the hub assembly compensates for inconsistencies in the dimensioning of the roll core and irregularities in the manner in which sheet material is wound onto the core to assure proper tracking of the sheet material as it leaves the roll and passes through the machine.

SUMMARY OF THE INVENTION

In accordance with the present invention a machine for working on a roll of sheet material having a generally cylindrical tubular roll core upon which the sheet material is wound includes a hub assembly having a generally cylindrical flanged hub member adapted to be received within an associated end of a roll core. The cylindrical hub member has an outside diameter smaller than the inside diameter of the smallest roll core expected to be supported and/or driven by the hub assembly. The hub member further includes a rough generally cylindrical outer peripheral surface for rolling frictional engagement with the inner surface of the roll core. The flange which comprises a part of the hub assembly is disposed adjacent the outer end of the hub member and has a generally radially disposed and axially inwardly facing flange surface. The flange and the hub may cooperate to define an annular recess surrounding an outer end portion of the hub member and opening inwardly through the flange surface for receiving the end portion of a roll core which projects beyond the radially disposed end face of the sheet material wound on the roll core.

BRIEF DESCRIPTION OF THE DRAWINGS

FIG. 3 is a somewhat enlarged fragmentary sectional view taken along the line 3—3 of FIG. 2.

FIG. 4 is a somewhat further enlarged end elevational view of a hub assembly.

FIG. 5 is a sectional view taken along the line 5—5 of FIG. 4.

FIG. 6 is a fragmentary side elevational view of the hub assembly of FIGS. 4 and 5.

FIG. 8 is a plan view of a part of the paper advancing mechanism.

FIG. 9 is a fragmentary side elevational view of another hub assembly.

FIG. 10 is a somewhat schematic perspective view of another plotter embodying the invention.

DETAILED DESCRIPTION OF PREFERRED EMBODIMENT

Figure 1:
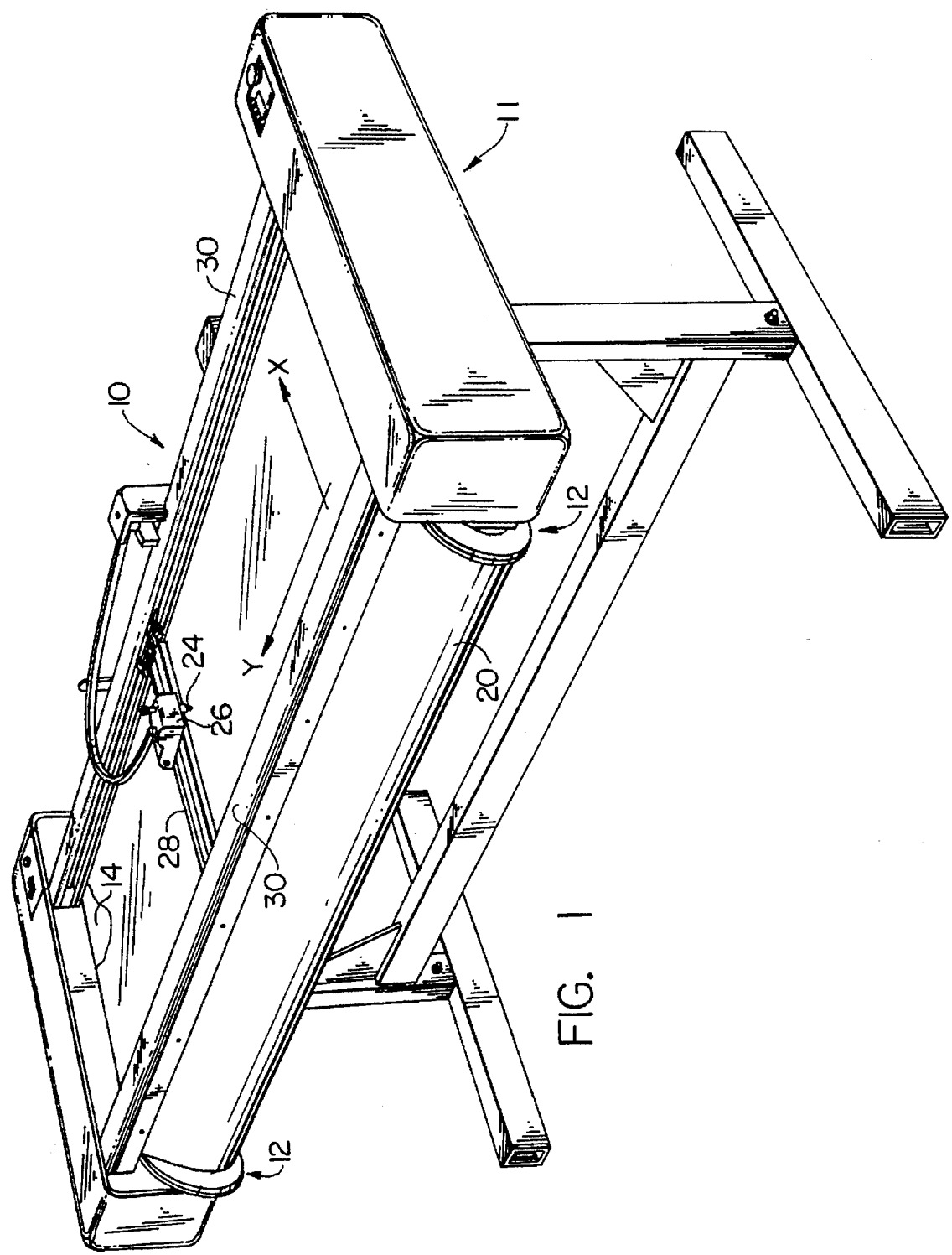
FIG. 1 is a perspective view of a plotter embodying the invention.

In the drawings and in the description which follows the invention is illustrated and described with reference to a progressive plotter 10 having an improved flanged hub assembly 12 embodying the present invention for supporting and driving rolls of commercially available sheet material or paper wound on cylindrical tubular cardboard roll cores. A plotter of the type shown is illustrated and described in U.S. Pat. No. Re. 34,294 to Gerber, entitled Progressive Plotter With Unidirectional Paper Movement, reissued Jun.29, 1993, assigned to the assignee of the present invention, and hereby adopted by reference as part of the present disclosure.

It is sufficient to note, for a complete understanding of the invention, that the plotter 10 includes a table, indicated generally by the numeral 11 which has an upwardly facing support or work surface 14. The work surface 14 is generally rectangular and has two side edges 16 and 18, best shown in FIG. 3. A supply roll 20 having a tubular cardboard roll core C with a web of sheet material or paper P wound thereon is supported near the left-hand side edge 16 for rotation about an axis parallel to and below the latter side edge. A take-up roll 22 which includes a cylindrical tubular cardboard roll core C for receiving paper from the supply roll 20 is supported in the machine near the right-side edge 18 for rotation about an axis parallel to and below the side edge 18.

The illustrated machine 10 further includes an instrument or plotting pen 24 mounted on an instrument carriage 26 supported to travel in an illustrated X-coordinate direction along a main or Y-carriage 28. The main carriage 28 is supported at its opposite ends for movement in the illustrated Y-coordinate direction by a pair of guide rails 30, 30 mounted in fixed position on the machine above and at opposite sides of the work surface 14. A cable and pulley system, shown in part in FIGS. 2 and 3 and indicated generally by the reference numeral 32, includes an X drive motor 34 and a Y drive motor 36. The X and Y drive motors 34 and 36 receive command signals from a programmable controller (not shown) via a cable 38 shown in FIG. 2 to produce compound movements of the pen 24 relative to a section of the paper web P supported on the work surface 14. Paper is advanced across the work surface 14 by a supply roll drive motor 40 and a take-up roll drive motor 42, respectively coupled to the supply roll 20 and the take-up roll 22, in response to command signals received from the aforementioned programmable controller.

Figure 2:
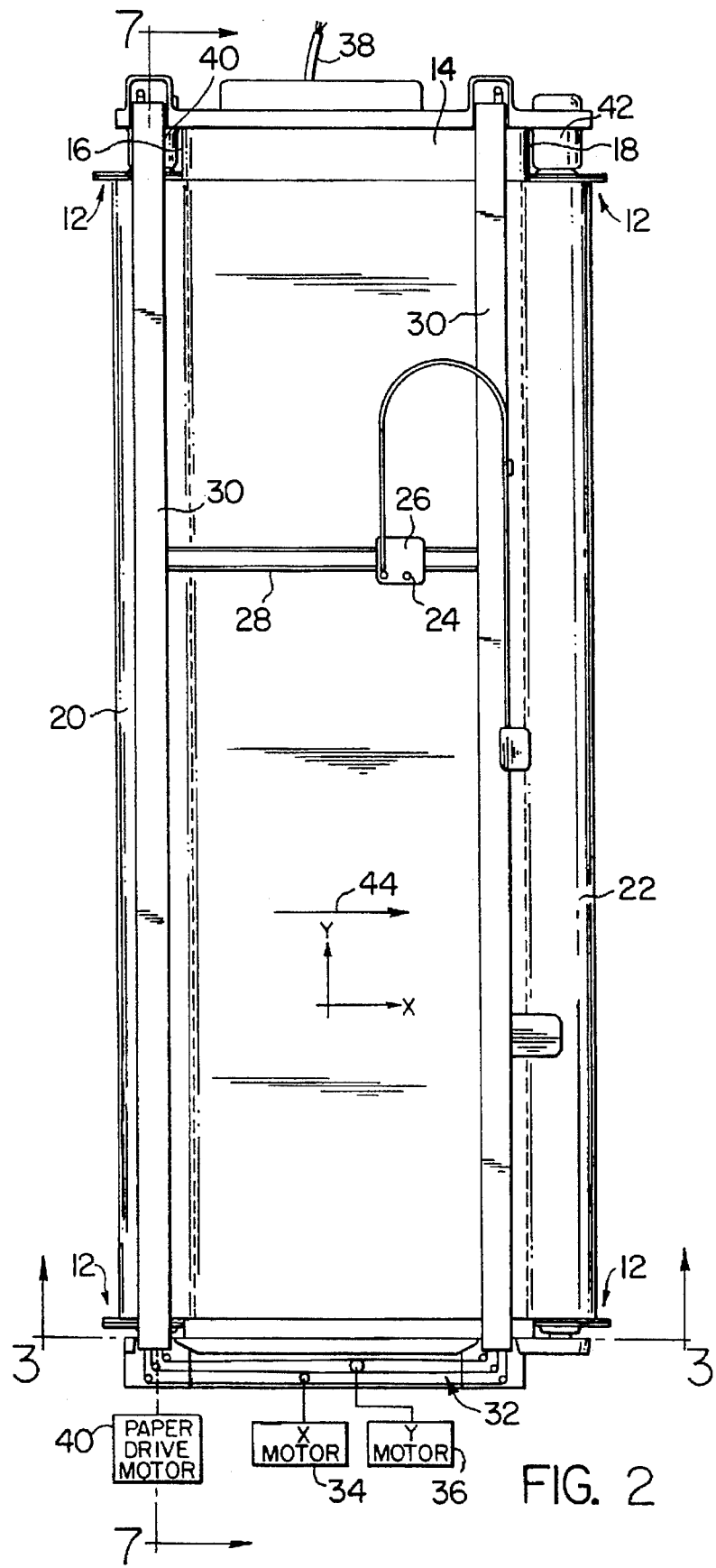
FIG. 2 is a plan view of the plotter of FIG. 1 with the end covers removed.

The progressive plotter 10 provides unidirectional paper advancement over the work surface 14 from left to right, as shown in FIGS. 2 and 3 of the drawings or in the direction indicated by the directional arrow 44. Generally, a drawing produced by the machine 10 has a considerably longer length than the width of the work surface, that is the lateral distance between the side edges 16 and 18.

In producing a drawing progressively the plotting pen 24 is preferably positioned at a starting point near the right-side of the work surface 14, as it appears in FIGS. 2 and 3. A drawing is progressively produced by moving the drawing instrument or plotting pen 24 from the right-hand side toward the left-hand side of the machine while the drawing paper P is simultaneously advanced from left to right over the work surface 14 to accommodate the advancement of the drawing process. Thus, a drawing may be produced by continuous coordinated movements of the paper P and the drawing instrument 24, but more often a drawing is produced in a section-by-section mode by intermittently and alternately advancing the drawing instrument 24 and the paper P. More specifically, in creating a drawing, section-by-section, after a drawing or portion of a drawing has been produced on a section of the paper the drawing process is interrupted and the paper is advanced to position the next section of the paper web on the work surface 14 so that the drawing process may proceed.

Whether plot or drawing is produced continuously or section-by-section, the paper must track in a precisely controlled manner as it is advanced over the work surface 14 to assure proper line registration from section to section as a plot or drawing is progressively produced on the paper. Any yawing or skewing of the paper as it moves relative to the work surface will result in an unsatisfactory work product.

In accordance with the invention, the hub assembly 12 compensates for roll core dimensional inconsistencies and other roll core irregularities encountered when rolls of sheet material procured from a variety of commercial sources are processed by the machine 10. Referring now particularly to FIGS. 4–6 the illustrated flanged hub assembly 12 essentially comprises a hub member 48, a flange 50 and a retaining member or split collar 52 which cooperates with the hub member to retain the flange in assembly with the hub member. The hub member 48 is generally cylindrical, preferably made from metal and has a rough outer peripheral surface 54. In accordance with one presently preferred hub assembly construction, the outer peripheral surface 54 on the hub member 48 is roughened by the application of a 96 pitch straight knurl.

The hub flange 50 may be made from any suitable material but preferably it is made from polyvinyl chloride or KYDEX and is supported at the axially outer end of the hub member 48. The flange 50 has a generally radially disposed and axially inwardly facing flange surface 56, axially inwardly spaced or offset from the axially outer end of the hub member 48, and a coaxial cylindrical outer peripheral edge 58. The flange 50 and the hub member 48 cooperate to define an axially inwardly open annular recess 60 which is shown in FIG. 5 and is preferably generally cylindrical. The axially inner end portion of the recess, indicated at 66, has a radius, diverges inwardly toward the flange surface 56 and opens through the latter surface to define an annular aperture 68 communicating with the recess 60.

A generally circular elastomeric disc, 70 preferably made from rubber, such as neoprene 65–75 Shore A durometer, covers substantially the entire flange surface 56 and has a central opening defining a free inner peripheral edge 72 closely coaxially surrounding an associated portion of the hub member 48. The disc 70 substantially covers the aperture 68 which opens into the recess 60. The flange 50 is disposed intermediate the axially outer end portion of the hub 48 and the split collar 52. Fasteners 76, 76 extend through the collar 52 and the flange 50 and threadably engage the hub member 48 to retain the hub assembly 12 in its assembled condition. The hub member 48, flange 50 and the split collar 52 cooperate to define a generally cylindrical shaft receiving bore 78 which extends coaxially through the hub assembly 12. A clamping fastener 80 associated with the split collar 52 is provided for securing the hub assembly 12 to an associated shaft, in a manner well known in the art.

As previously noted, the hub assembly 12 is employed to compensate for the dimensional inconsistencies and winding irregularities associated with cardboard roll cores upon which webs of sheet material are wound. Such roll core dimensional inconsistencies are often present in a group of roll cores, particularly where the cores have been obtained from more than one source. However, the range of such dimensional inconsistencies is generally predictable. In the present instance the outside diameter of the roughened hub member 54 is substantially smaller than the inside diameter of the smallest roll core expected to be used in the machine. The minor radial dimension of the outer peripheral surface of the recess 60 is at least slightly larger than the expected maximum difference between the outside diameter of the hub member 48 and the inside diameter of the largest expected roll core to be supported by the hub assembly plus the expected maximum thickness of the roll core and the thickness of the disc 70. Thus, the recess 60 is sized to receive therein the projecting end portion of the largest roll core expected to be processed by the machine 10.

Figure 7:
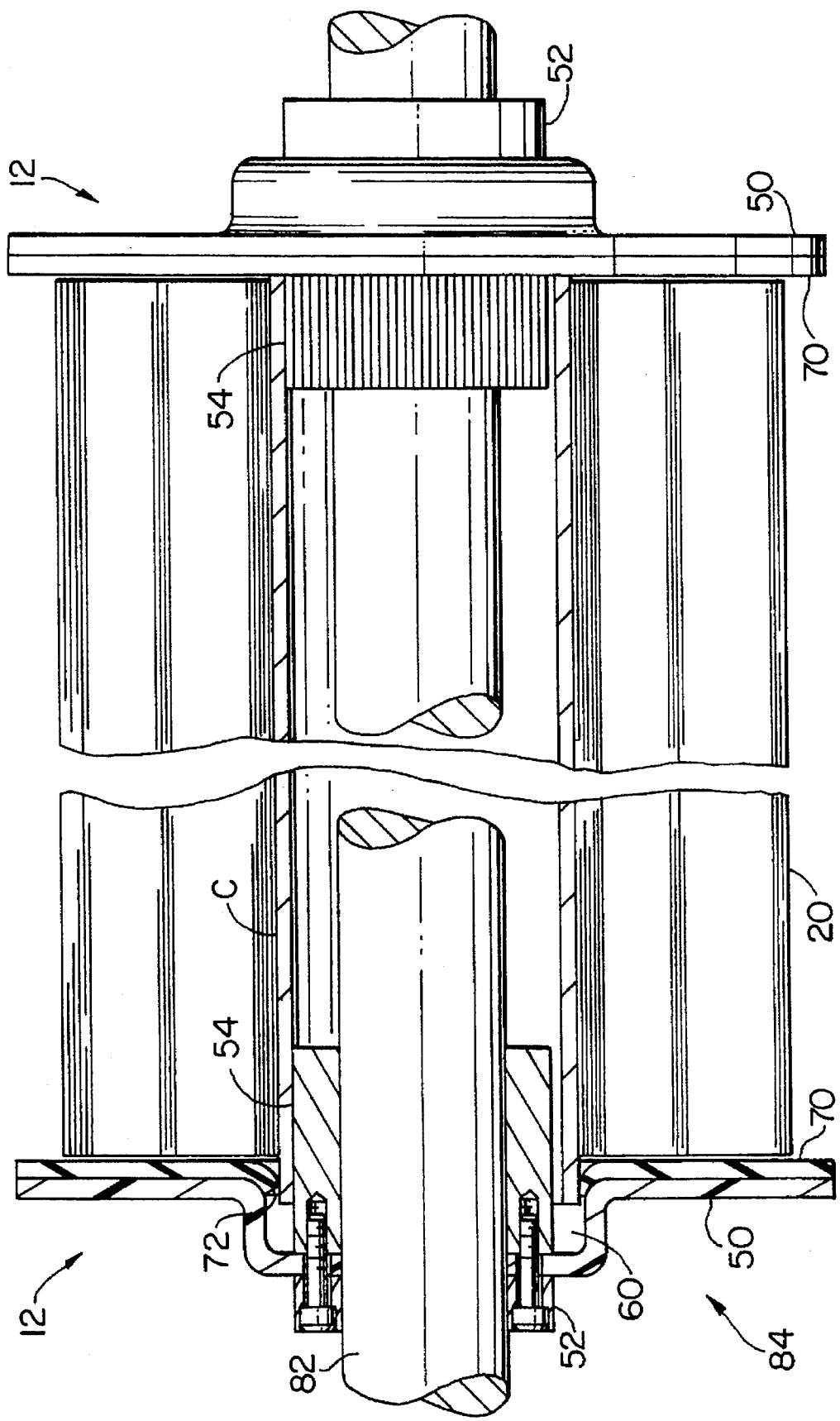
FIG. 7 is a somewhat enlarged fragmentary sectional view taken along the line 7—7 of FIG. 2.

In accordance with presently preferred practice, a supply roll 20 to be supported in the machine 10 is chucked between a pair of hub assemblies 12, 12 mounted on a common mandrel or roll core shaft 82 which extends through the tubular cardboard core of the supply roll to provide a roll core shaft assembly indicated generally at 84, as shown in FIG. 7 where the roll core is indicated by the letter C. Each hub assembly 12 is secured in fixed position on the roll core shaft 82 by an associated split collar 52. The hub assemblies 12, 12 are arranged on the roll core shaft 82 with the opposing radial inner faces of the elastomeric discs 70, 70 in near engagement with the outwardly facing radially disposed surfaces of the material wound upon the roll core C. Thus, the supply roll is free to rotate on the roll core shaft assembly 84 and in rolling engagement with the rough outer peripheral surfaces 54, 54 of the hub members 48, 48.

Since the outside diameter of each hub member 48 is substantially smaller than the inside diameter of the associated end portion of the roll core C which it supports it will be apparent that no difficulty will be encountered in assembling the roll core shaft assembly 84 with the roll core C. Consequently, the roll core shaft assembly may be readily and rapidly assembled with an associated roll core such as the roll core C.

In the event that an end portion of the roll core should protrude beyond the radially disposed end of the wound material on the roll core as shown at the left-hand end of the assembly in FIG. 7, the protruding end portion of the roll core C will enter the recess 60 in the associated hub assemblies 12 so that the radially inwardly facing surface of the elastomeric disc 70 mounted thereon may be brought into near engagement with the associated outwardly facing radial surface of the wound material on the roll core. Since the recess 60 is dimensioned to accept the protruding end portion of the largest roll core expected to be supported by a hub 48 the protruding end portion may enter the recess 60 by deflecting the free inner peripheral edge portion 72 of the disc 70 in an axially outward direction and into the recess 60.

In like manner the take-up roll 22 or more specifically the roll core C upon which the material receives from the supply roll is to be wound is also chucked between a pair of hub assemblies 12, 12 mounted on a mandrel or roll core shaft 82 in the manner hereinbefore discussed with reference to the supply roll 20. The roll core shaft assemblies 84, 84 are mounted in the machine 10 with the flanges at associated ends of the rolls disposed within common planes, as best shown in FIG. 8. Thus, when the supply roll motor 40 and the take-up roll motor 42, to which the roll core shaft of the supply roll and the take-up roll are coupled, operate in response to signals from the controller to advance paper relative to the work surface 14 the flanges 50, 50 on the hub assemblies 12, 12 cooperate to precisely control the track of the paper web P so that the paper tracks along a path normal to the axes of the supply and take-up rolls 20 and 22 and across the work surface 14 thereby eliminating the risk of paper skewing. The inner end portions of the elastomeric discs 70, 70 cover the apertures 68, 68 when there is very little paper on the roll core C to prevent telescoping of paper into the recesses 60, 60 thereby assuring that the paper will continue to properly track across the work surface 14 until the paper supply on the supply roll 20 has been exhausted.

Further referring to the drawings and considering now FIG. 9, another embodiment of the hub assembly is shown and indicated generally at 12a. The illustrated hub assembly 12a is identical in most respects to the hub assembly 12, previously described. However, the rough outer peripheral surface 54a on the hub member 48a is provided by a covering of abrasive paper 85 wrapped about and adhered to the otherwise smooth peripheral surface of the hub member 48a. The coefficient of rolling friction between the inner surface of a cardboard roll core C and the rough outer peripheral surface of the hub 48a may be generally predetermined by proper choice of the abrasive material 85 applied to the hub surface.

Referring now to FIG. 10 another machine for working on long lengths of sheet material wound upon generally cylindrical tubular roll cores is somewhat schematically illustrated and indicated generally by the reference numeral 10b. The illustrated machine 10b has a table 11b which defines a rectangular work surface 14b which has side edges indicated respectively at 16b and 18b. A supply roll 20b having a roll core (not shown) with a web of sheet material or paper P wound thereon is supported near the side edge 16b for rotation about an axis parallel to the side edge 16b. A pair of drive rolls 86, 86 defining a nip 88 therebetween and driven by a motor 87 are supported at the opposite side of the work surface 14b near the side edge 18b for rotation about axes below and in parallel relation to the side edge 18b for receiving paper P from the supply roll 20b. A dancer roll 90 restrained for free vertical movement is disposed within a supply loop 92 formed by the paper P between the supply roll 20b and the side edge 16b, substantially as shown. The dancer roll 90 cooperates with the drive rolls 86, 86 to maintain tension on the paper P spread upon the work surface 14b. Sensing devices, such as photoelectric cells indicated generally at 94 detect the high and low limits of the loop 92 maintained by the dancer roll 90 and control the operation of the supply roll drive motor 40b to pay-off paper P from the supply roll 20b when the sensing device 94 indicates that the paper in the supply loop 92 has reached its upper limit and arrest rotation of the supply roll when the paper in the supply loop has reached its lower limit.

A take-up roll 22b which includes a generally cylindrical tubular cardboard core (not shown) receives paper from the feed rolls 86, 86. The take-up roll 22b is supported on a roll core shaft assembly 84b which includes a roll core shaft 82b and a pair of hub assemblies 12b, 12b, substantially as aforedescribed. The roll core shaft assembly 84b is preferably coupled to and driven by the feed rolls 86, 86 by a drive mechanism, indicated generally at 96, and at a slightly higher rotational speed than that of the feed rolls 86, 86. Since the roll core of the take-up roll 22b has a somewhat larger inside diameter than the outside diameters of the hub members which comprise the hub assemblies 12b, 12b the take-up roll core supported by the hub assemblies 12b, 12b will rotate in rolling engagement with the latter hub assemblies in the manner generally aforedescribed. Thus, when tension on the paper P leaving the feed rolls 86, 86 exceeds the driving force applied to the paper by rolling frictional engagement of the hub assemblies 12b, 12b with the take-up roll core 22b slippage will occur between the rotating hub assemblies 12b, 12b and the roll core of the take-up roll 22b. Thus, the hub assemblies 12b, 12b which support the take-up roll core cooperate with the take-up roll core to function as a slip clutch and maintain light tension in the paper during the take-up winding operation, thereby eliminating the need for an expensive clutch mechanism to perform this function. The coefficient of rolling friction between the take-up roll core and the rotating hub assemblies 12b, 12b may be controlled by increasing or decreasing the roughness of the peripheral surfaces of the hub members which comprise the hub assemblies 12b, 12b, as may be required to produce the desired result.

I claim:

1. In an apparatus for working on sheet material and having means defining a work surface, a tool for working on sheet material, means for supporting the tool to move in working relation to material supported on the work surface in response to signals received from a programmable controller and mounting means for supporting a roll of sheet material having a generally cylindrical tubular roll core upon which the sheet material is wound and including a hub assembly having a generally cylindrical hub member and a flange supported at the axially outer end of said hub member and having a generally radially disposed and axially inwardly facing flange surface and a coaxial circular outer peripheral edge, the improvement comprising said hub member having an outside diameter substantially smaller than the inside diameter of the smallest roll core expected to be supported by said hub assembly, said hub member having a rough generally cylindrical hub surface for rolling engagement with a portion of the inner peripheral surface of the roll core.

2. In an apparatus for working on sheet material as set forth in claim 1 the further improvement wherein said rough hub surface is further characterized as a knurled surface.

3. In an apparatus for working on sheet material as set forth in claim 1 the further improvement wherein said rough hub surface is defined by abrasive material adhered to said hub member.

4. In an apparatus for working on sheet material as set forth in claim 1 the further improvement wherein said flange and said hub member define an annular recess surrounding a portion of said hub member and including an annular aperture opening axially inwardly through said flange surface.

5. In an apparatus for working on sheet material as set forth in claim 4 the further improvement wherein said annular recess includes a coaxial outer peripheral surface having a circular radial cross section.

6. In an apparatus for working on sheet material as set forth in claim 5 the further improvement wherein said recess is generally cylindrical.

7. In an apparatus for working on sheet material as set forth in claim 4 the further improvement wherein said hub assembly includes an elastomeric disc covering said flange surface and said annular aperture and having a free inner peripheral edge coaxially surrounding a portion of said hub.

8. In an apparatus for working on sheet material as set forth in claim 7 the further improvement wherein said disc is adhered to said flange surface.

9. In an apparatus for working on sheet material as set forth in claim 7 the further improvement wherein said disc is rubber.

10. In an apparatus for working on sheet material as set forth in claim 7 the further improvement wherein the outer peripheral surface of said recess has a minor radial dimension at least equal to the expected maximum difference between the outside diameter of said hub member and the inside diameter of the largest expected roll core to be supported by said hub assembly plus the expected maximum thickness of the roll and the thickness of said elastomeric disc.

11. In an apparatus for working on sheet material as set forth in claim 4 the further improvement wherein the axially inner end portion of said recess diverges toward said flange surface.

12. In an apparatus for working on sheet material as set forth in claim 1 the further improvement wherein said hub assembly includes retaining means for securing said flange to said hub member.

13. In an apparatus for working on sheet material as set forth in claim 12 the further improvement wherein said retaining means comprises means for releasably securing said hub assembly to a shaft.

14. In an apparatus for working on sheet material as set forth in claim 13 the further improvement wherein said retaining means comprises a split collar having a shaft receiving bore and disposed coaxially adjacent the axially outer end of said flange and a plurality of threaded fasteners extending through said collar and said flange and threadably engaging said hub member.

15. In an apparatus for working on sheet material as set forth in claim 14 the further improvement wherein said shaft receiving bore is further defined by said hub member and said flange.

16. In an apparatus for working on sheet material and having mounting means for supported a roll of sheet material having a generally cylindrical tubular roll core upon which the sheet material is wound and including a mandrel extend through the tubular core and a pair of opposing hub assemblies mounted in fixed position on said mandrel at opposite ends of the roll core, each of aid hub assemblies having a generally cylindrical hub member extending into and associated end of said tubular roll core and having an annular flange at its axially outer end, the improvement wherein each of the hub members has a diameter substantially equal to the diameter of the other of said hub members and substantially smaller than the inside diameter of the smallest roll core expected to be supported by said hub assemblies and each of said hub members has a rough generally cylindrical hub surface for rolling engagement with a portion of the inner peripheral surface of the roll core.

17. In an apparatus for working on sheet material as set forth in claim 16 the further improvement wherein said rough generally cylindrical surface comprises a knurled surface.

18. In an apparatus for working on sheet material as set forth in claim 16 the further improvement wherein said rough surface is defined by abrasive material adhered to each said hub surface.

19. In an apparatus for working on sheet material as set forth in claim 16 the further improvement wherein each of said hub members cooperates with its associated flange to define an axially inwardly open coaxial recess for receiving an end portion of the roll core protruding beyond the associated radially disposed end portion of the sheet material wound on the roll core and wherein the minor radial dimension of the outer peripheral surface of said recess defined by said associated flange is at least equal to the expected maximum difference between the outside diameter of said hub member and the inside diameter of the largest expected roll core to be supported by said hub assemblies plus the expected maximum thickness of the roll core.

20. In an apparatus for working on sheet material and having means defining a work surface for supporting sheet material, a tool, means supporting the tool to move relative to material supported on the work surface in response to command signals received from a programmable controller, a supply roll supported at one side of the work surface, feeding means at the side of the work surface opposite said one side for receiving sheet material from said supply roll and advancing the sheet material across the work surface, and means between said one side and said supply roll for maintaining substantially constant tension in the material extending across the work surface, the improvement comprising a take-up roll for receiving the material advanced by the feeding means and having a generally cylindrical tubular cardboard roll core upon which the material received from the feeding means is wound and including a flange defining a generally radially disposed flange surface and a coaxial generally cylindrical hub projecting axially inwardly beyond said flange surface and received within an associated end of said tubular roll core, said cylindrical hub member having an outside diameter substantially smaller than the inside diameter of the smallest roll core expected to be received on the machine, said hub member having a rough generally cylindrical peripheral surface for rolling engagement with a portion of the inner peripheral surface of the roll core, and hub driving means for driving the hub assembly to maintain tension on the material received form said feeding means as the material is wound on said take-up roll.

* * * * *